US012670107B2

(12) United States Patent
Botman et al.

(10) Patent No.: US 12,670,107 B2
(45) Date of Patent: Jun. 30, 2026

(54) TECHNIQUE FOR CONSTRAINING ACCESS TO MEMORY USING CAPABILITIES

(71) Applicant: Arm Limited, Cambridge (GB)

(72) Inventors: François Christopher Jacques Botman, Cambridge (GB); Thomas Christopher Grocutt, Cambridge (GB); Bradley John Smith, Edmunds (GB)

(73) Assignee: Arm Limited, Cambridge (GB)

( * ) Notice: Subject to any disclaimer, the term of this patent is extended or adjusted under 35 U.S.C. 154(b) by 307 days.

(21) Appl. No.: 18/556,468

(22) PCT Filed: Feb. 17, 2022

(86) PCT No.: PCT/GB2022/050429
§ 371 (c)(1),
(2) Date: Oct. 20, 2023

(87) PCT Pub. No.: WO2022/229590
PCT Pub. Date: Nov. 3, 2022

(65) Prior Publication Data
US 2024/0193101 A1      Jun. 13, 2024

(30) Foreign Application Priority Data

Apr. 28, 2021      (GB) ..................................... 2106069

(51) Int. Cl.
*G06F 12/14*              (2006.01)
(52) U.S. Cl.
CPC ................................ *G06F 12/1458* (2013.01)
(58) Field of Classification Search
CPC .................................................. G06F 12/1458
(Continued)

(56) References Cited

U.S. PATENT DOCUMENTS

2011/0078389 A1      3/2011   Patel et al.
2018/0225120 A1*    8/2018   Barnes ................... G06F 21/52
(Continued)

FOREIGN PATENT DOCUMENTS

CN          112602069          4/2021
GB          2541714 A          3/2017
(Continued)

OTHER PUBLICATIONS

Bedichek, Robert. "Some efficient architecture simulation techniques." In Proceedings of the Winter 1990 USENIX Conference, pp. 53-64. 1990. (Year: 1990).*
(Continued)

*Primary Examiner* — Reginald G Bragdon
*Assistant Examiner* — Aaron D Ho
(74) *Attorney, Agent, or Firm* — NIXON & VANDERHYE P.C.

(57)          ABSTRACT

A technique is provided for constraining access to memory using capabilities. An apparatus is provided that has processing circuitry for performing operations during which access request to memory are generated, wherein the processing circuitry is arranged to generate memory addresses for the access requests using capabilities that provide a pointer value and associated constraining information. The apparatus also provides capability generation circuitry, that is responsive to the processing circuitry executing a capability generating instruction that identifies a location in a literal pool of the memory, to retrieve a literal value from the location in the literal pool, and to produce a generated capability in which the pointer value of the generated capability is determined from the literal value. The constraining information of the generated capability is selected from a limited set of options in dependence on information specified by the capability generating instruction. It has been
(Continued)

found that such an approach provides a robust mechanism for generating capabilities, whilst reducing code size.

20 Claims, 13 Drawing Sheets

(58) Field of Classification Search
USPC .......................................................... 711/163
See application file for complete search history.

(56)                    References Cited

U.S. PATENT DOCUMENTS

| | | | | |
|---|---|---|---|---|
| 2018/0349294 | A1* | 12/2018 | Barnes | G06F 12/1441 |
| 2019/0095356 | A1* | 3/2019 | Milojicic | G06F 12/023 |
| 2020/0065109 | A1* | 2/2020 | Shen | G06F 9/3013 |
| 2020/0142700 | A1* | 5/2020 | Barnes | G06F 9/30101 |
| 2020/0218673 | A1* | 7/2020 | Parker | G06F 12/1458 |
| 2021/0026773 | A1* | 1/2021 | Smith | G06F 21/79 |

FOREIGN PATENT DOCUMENTS

| | | | | | |
|---|---|---|---|---|---|
| GB | 2578135 | A | * | 4/2020 | ........ G06F 12/1483 |
| TW | 201901423 | | | 1/2019 | |

OTHER PUBLICATIONS

International Search Report for International Application No. PCT/GB2022/050429 dated May 18, 2022.
Watson et al., "Capability Hardware Enhanced RISC Instructions: CHERI Instruction-Set Architecture," University of Cambridge, Technical Report, p. 51-96, Apr. 30, 2017.
Office Action for TW Application No. 111114754 issued Dec. 18, 2025 and English translation, 23 pages.

* cited by examiner

A)      SET    PR1 = 140000  ———➤ trigger error

B)      SET    PR1 = 140000

LD    R5,   PR1      ———➤ trigger error

DETERMINING BOUNDS

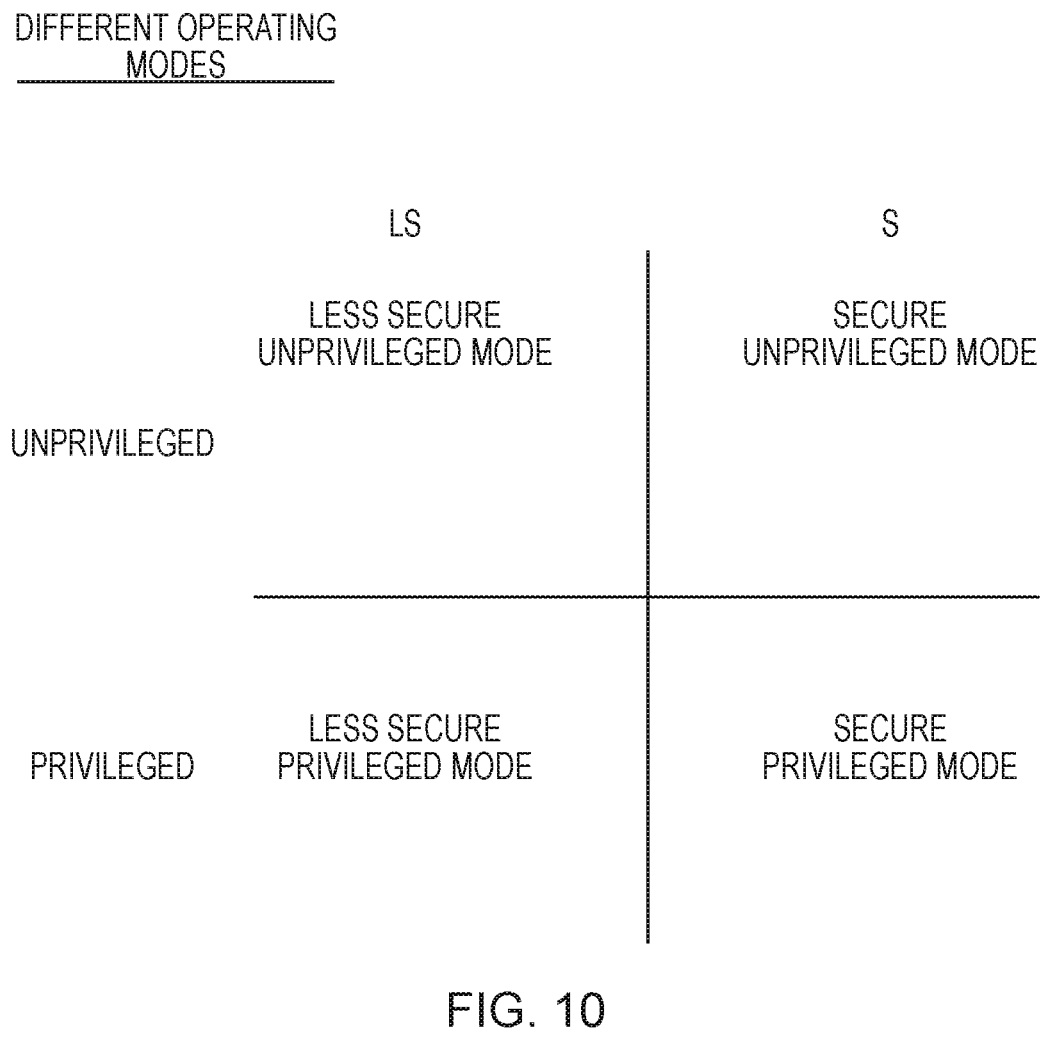

DIFFERENT OPERATING
MODES

|  | LS | S |
|---|---|---|
| | LESS SECURE UNPRIVILEGED MODE | SECURE UNPRIVILEGED MODE |
| UNPRIVILEGED | | |
| PRIVILEGED | LESS SECURE PRIVILEGED MODE | SECURE PRIVILEGED MODE |

FIG. 10

GENERATING
MULTIPLE
CAPABILITIES
FROM ONE
CAPABILITY
GENERATING
INSTRUCTION

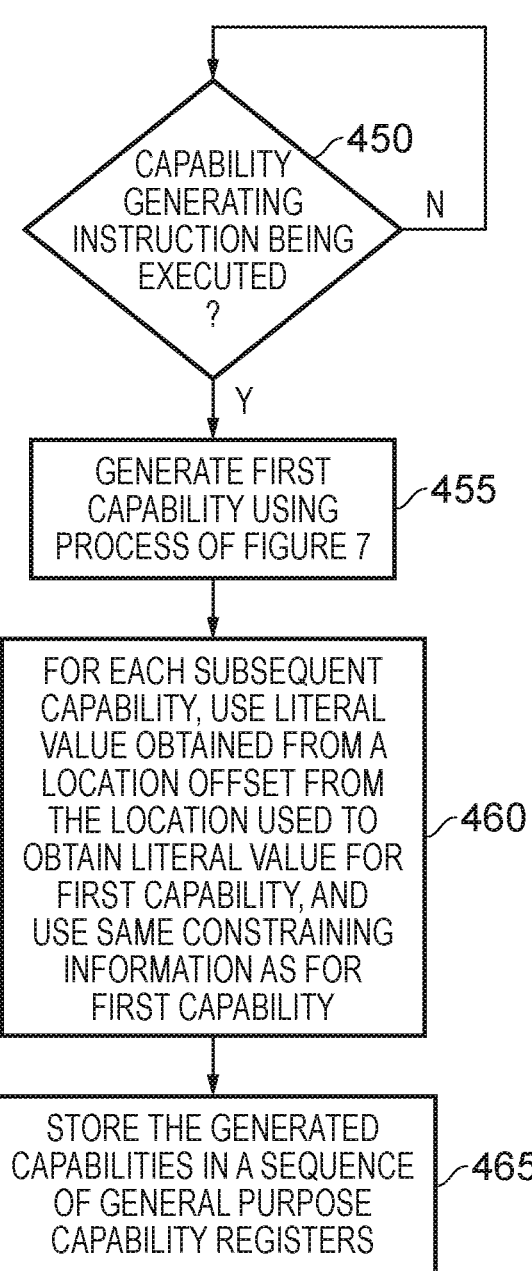

CAPABILITY
GENERATING
INSTRUCTION BEING
EXECUTED
?

450

N

Y

GENERATE FIRST
CAPABILITY USING
PROCESS OF FIGURE 7

455

FOR EACH SUBSEQUENT
CAPABILITY, USE LITERAL
VALUE OBTAINED FROM A
LOCATION OFFSET FROM
THE LOCATION USED TO
OBTAIN LITERAL VALUE FOR
FIRST CAPABILITY, AND
USE SAME CONSTRAINING
INFORMATION AS FOR
FIRST CAPABILITY

460

STORE THE GENERATED
CAPABILITIES IN A SEQUENCE
OF GENERAL PURPOSE
CAPABILITY REGISTERS

SIMULATOR
IMPLEMENTATION

TECHNIQUE FOR CONSTRAINING ACCESS TO MEMORY USING CAPABILITIES

BACKGROUND

The present technique relates to the field of data processing, and more particularly to the constraining of access to memory using capabilities.

There is increasing interest in capability-based architectures in which certain capabilities are defined for a given process, and an error can be triggered if there is an attempt to carry out operations outside the defined capabilities. The capabilities can take a variety of forms, but one type of capability is a bounded pointer (which may also be referred to as a "fat pointer").

It is important that the ability to create capabilities is tightly controlled, as the capabilities are used as a security control measure within the system, for example by enforcing that accesses to memory performed with reference to a capability can only be performed in respect of memory locations within a defined region determined from the capability, and only if certain permission checks also defined by the capability are met.

One mechanism that can be used for generating capabilities involves a compiler being allowed to generate capabilities at the time of compiling the associated program code, with the generated capabilities then being stored inside literal pools that, in combination with the compiled program code, then form a static image in non-volatile memory. When the program code is run, the compiler-generated capabilities stored in the literal pool can then be loaded into registers using instructions within the compiled code. In some systems, it may possible to modify a capability once it has been loaded into such registers, but in a typical system any modifications will only be allowed to reduce the bounds or reduce the permissions associated with the capability, hence resulting in a reduced capability relative to the original compiler-generated capability.

While using a compiler to generate capabilities allows robust control over capability generation, it can have significant adverse effects on the code size of the static image. In particular, storing capabilities in a literal pool can significantly increase the overall code size, due to the inherently larger size of capabilities relative to conventional pointers, and also due to alignment requirements associated with such capabilities. In many low cost systems, the devices are typically memory constrained and non-volatile storage is at a premium, and accordingly the increase in code size resulting from the use of compiler-generated capabilities is unattractive in such situations. It would hence be desirable to provide an improved mechanism for providing such capabilities whilst retaining a tight degree of control on the way in which those capabilities can be generated.

SUMMARY

In one example arrangement, there is provided an apparatus comprising: processing circuitry to perform operations during which access requests to memory are generated, wherein the processing circuitry is arranged to generate memory addresses for the access requests using capabilities that provide a pointer value and associated constraining information; and capability generation circuitry, responsive to the processing circuitry executing a capability generating instruction that identifies a location in a literal pool of the memory, to retrieve a literal value from the location in the literal pool, and to produce a generated capability in which the pointer value of the generated capability is determined from the literal value, and the constraining information of the generated capability is selected from a limited set of options in dependence on information specified by the capability generating instruction.

In another example arrangement, there is provided a method of constraining access to memory, comprising: employing processing circuitry to perform operations during which access requests to memory are generated, wherein the processing circuitry generates memory addresses for the access requests using capabilities that provide a pointer value and associated constraining information; and performing a capability generation operation in response to the processing circuitry executing a capability generating instruction that identifies a location in a literal pool of the memory, the capability generation operation comprising retrieving a literal value from the location in the literal pool, and producing a generated capability in which the pointer value of the generated capability is determined from the literal value, and the constraining information of the generated capability is selected from a limited set of options in dependence on information specified by the capability generating instruction.

In a still further example arrangement, there is provided a computer program for controlling a host data processing apparatus to provide an instruction execution environment, comprising: processing program logic to perform operations during which access requests to memory are generated, wherein the processing program logic is arranged to generate memory addresses for the access requests using capabilities that provide a pointer value and associated constraining information; and capability generation program logic, responsive to the processing program logic executing a capability generating instruction that identifies a location in a literal pool of the memory, to retrieve a literal value from the location in the literal pool, and to produce a generated capability in which the pointer value of the generated capability is determined from the literal value, and the constraining information of the generated capability is selected from a limited set of options in dependence on information specified by the capability generating instruction. A computer readable medium may be provided for storing such a computer program, and the computer readable medium may be in a non-transitory or a transitory form.

BRIEF DESCRIPTION OF THE DRAWINGS

The present technique will be described further, by way of illustration only, with reference to examples thereof as illustrated in the accompanying drawings, in which:

FIG. 10 shows an example of different domains and processing states of the processing circuitry, in accordance with one example implementation;

FIG. 12 is a flow diagram illustrating how multiple capabilities may be generated from a single capability generating instruction, in accordance with one example implementation.

DESCRIPTION OF EXAMPLES

Figure 1:
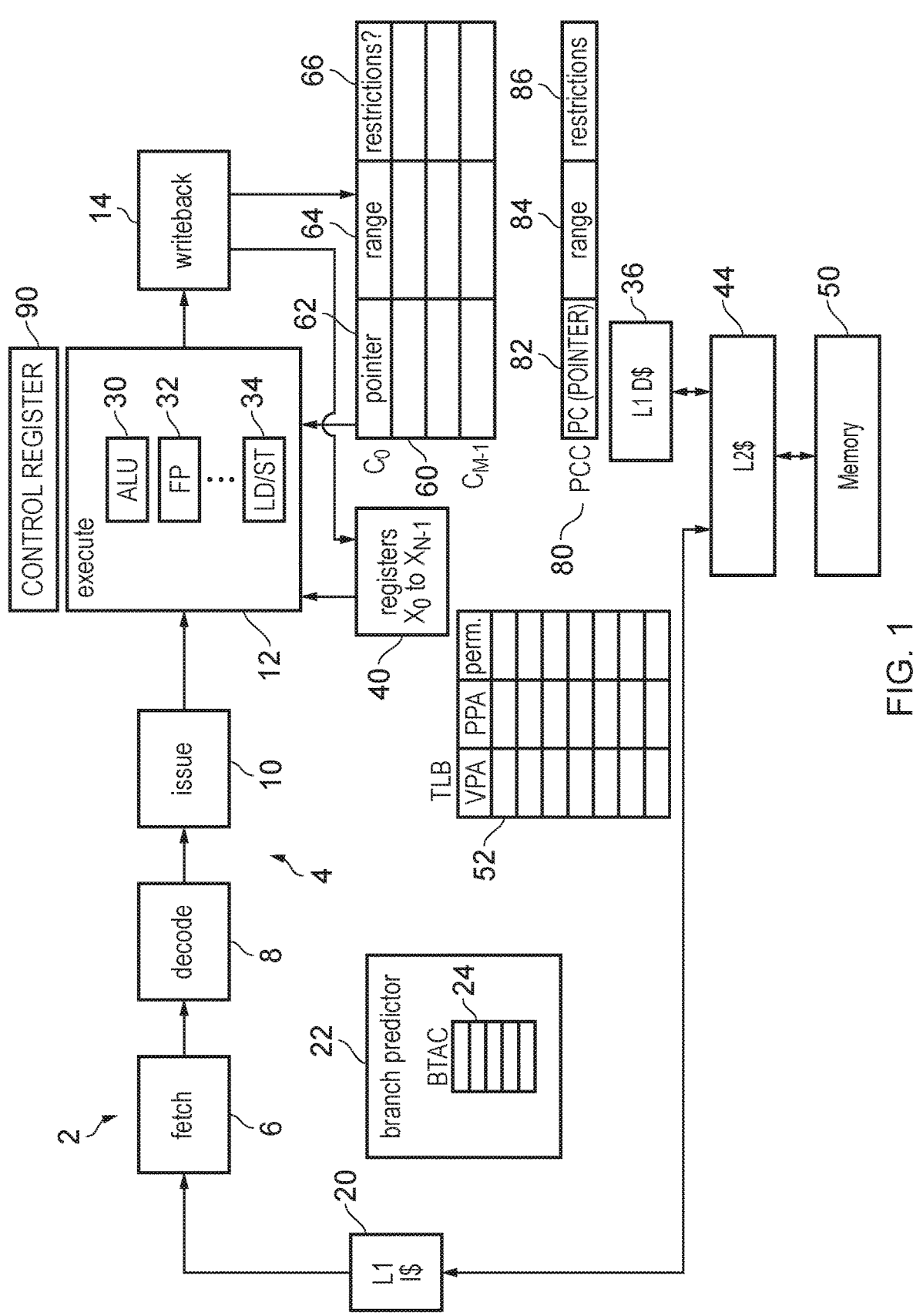
FIG. 1 is a block diagram of an apparatus in accordance with one example implementation.

In accordance with the techniques described herein, an apparatus is provided that has processing circuitry for performing operations during which access requests to memory are generated. The processing circuitry is arranged to generate memory addresses for the access requests using capabilities that provide a pointer value and associated constraining information. The memory address generated by the processing circuitry may be a virtual address in systems where address translation is performed, or alternatively may be a physical address in systems that do not support address translation.

In accordance with the techniques described herein, the apparatus may also provide capability generation circuitry, that is responsive to the processing circuitry executing a capability generating instruction that identifies a location in a literal pool of the memory, to retrieve a literal value from the location in the literal pool, and to produce a generated capability in which the pointer value of the generated capability is determined from the literal value. It should be noted that whilst the literal value can be used to determine the pointer value, the literal value itself is not a capability, and instead the capability generation circuitry is used to generate the capability whose pointer value is determined from the literal value. In order to generate the capability, the capability generation circuitry is further arranged to select the constraining information of the generated capability from a limited set of options in dependence on information specified by the capability generating instruction.

It has been found that such an approach enables capabilities to be generated that can be trusted to the same degree as capabilities generated by the compiler, but with a significant reduction in code size when compared with implementations incorporating compiler generated capabilities. In particular, with regard to the generated capabilities being trusted, in accordance with the techniques described herein the capability generation circuitry generates the capability by executing a capability generating instruction provided by the compiled code, with the capability generation circuitry only using a literal value from a literal pool (i.e. a value that will have been generated by the compiler and that is part of the static image), in combination with certain other information that is specified directly by the capability generating instruction. Since the capability is generated from a literal value in the literal pool, and avoids the requirement to store a compiler generated capability within the literal pool, the size of the literal pool can be significantly reduced. For example, the literal value may typically have a size of a standard pointer value, which is a significantly reduced size relative to the size of a corresponding capability. Further, the alignment issues associated with capabilities stored within the literal pool no longer arise, leading to further efficiencies and a further reduction in overall code size.

It has been found that such an approach can be of significant benefit in many systems. For example, it is often the case that a significant number of the required capabilities that may previously have been generated by the compiler only access a small region of memory, and typically only have certain restricted combinations of permissions. Hence the common subset of ranges and permissions used to form the constraining information of the capability can be identified as a limited set of available options to the capability generation circuitry, with one of those options then being selected when generating a capability in dependence on information specified by the capability generating instruction. This hence allows significant reductions in overall code size, by avoiding the need to specify a potentially large number of compiler generated capabilities within the static image, and instead allowing those capabilities to be generated during execution of the code using literal values in the literal pool, and constraining information selected from the identified limited set of options. It should be noted that for any capability that does not meet the requirements for being generated in the above manner (for example does not specify constraining information that falls within the limited set of options), a compiler-generated capability can instead be generated in the standard manner for storing in the literal pool.

The capability generation circuitry can take a variety of forms. It may for example be a separate component to the processing circuitry, or alternatively may be provided within the processing circuitry of the apparatus.

The apparatus may further be provided with capability checking circuitry for performing a capability check operation to determine whether a given access request whose memory address is generated using a given capability is permitted based on the constraining information provided by that given capability. As with the capability generation circuitry, the capability checking circuitry can be a separate component to the processing circuitry, or alternatively may be provided within the processing circuitry of the apparatus.

There are a number of ways in which the constraining information can be identified by the associated capability. For example, the capability may directly contain the constraining information in one example implementation. However, in an alternative implementation the capability may instead indicate (directly or indirectly) a location in memory where the constraining information is located.

There are a number of ways in which the capability generating instruction can identify the location in the literal pool from which the required literal value is to be retrieved. For example, a base address could be provided in a suitable system register, with the capability generating instruction then specifying an immediate value that can be used as an offset from that base address specified in the system register.

However, in one example implementation, the capability generating instruction specifies an immediate value that is used by the capability generation circuitry, in combination with a current program counter value, to identify the location in the literal pool containing the literal value to be used to determine the pointer value of the generated capability. This provides a particularly efficient mechanism, since typically the compiler will store a literal value at a location that is close to the instruction that will consume that literal value, and hence by specifying an immediate value that is used in combination with the current program counter value, where the current program counter value will identify the capability generating instruction, then this provides a simple and effective mechanism for identifying the location of the required literal value in the literal pool.

The immediate value can take a variety of forms, but in one example implementation provides a program counter relative offset, enabling the location in the literal pool to be identified merely by adding the immediate value to (or subtracting the immediate value from) the current program counter value.

The constraining information for the generated capability can take a variety of forms, but in one example implementation includes bounds information identifying a region of memory accessible using memory addresses derived from the pointer value of the generated capability, and the limited set of options comprises a limited set of allowable sizes of the region identified by the bounds information. As noted earlier, it has been found that a significant number of the capabilities required access only relatively small structures, and accordingly there may be a limited set of possible sizes of such structures which can be encoded as the limited set of options for the bounds information.

There are a number of ways in which the capability generating instruction can indicate to the capability generating circuitry which one of the limited set of allowable sizes is to be used for the capability to be generated. However, in one example implementation the capability generating instruction specifies a size indication value that is used by the capability generation circuitry to determine the size of the region from the limited set of allowable sizes. The size indication value can take a variety of forms. For example, it could directly specify the size, but alternatively any other suitable encoding could be used. For instance, the limited set of allowable sizes may vary by powers of 2, and hence the size indication value could identify which power of 2 applies to the current capability being generated. Alternatively, the size indication value could identify an offset relative to a predetermined minimum size. Hence, the size indication value would in that case effectively form an immediate value that could then be added to a predetermined minimum size value. By using such a minimum size value, this can allow a somewhat greater range of useful values to be specified. For example, a size indication value of 0 would still have a sensible meaning, in this case merely identifying that the size for the accessible region identified by the bounds information should be the predetermined minimum size.

However there are other ways in which the choice of size from the limited set of allowable sizes could be inferred by the capability generation circuitry from the information provided by the capability generating instruction. For example, the literal value may include a number of redundant bits that are not used to determine the pointer value, and the capability generation circuitry may be arranged to determine the size of the region from information provided within the redundant bits of the literal value. For example, there may be some level of alignment used in the pointer values determined from the literal value, which would mean that a certain number of least significant bits of the loaded literal value are not required to form the pointer value for the generated capability. In such instances, those redundant bits could instead be used to encode the size of the region that is to be identified by the constraining information of the generated capability.

The number of redundant bits could be predetermined, but in an alternative implementation the number of redundant bits could be varied. For example, the capability generation circuitry may be arranged to determine a boundary within the literal value between a first part specifying bits used to determine the pointer value and a second part containing the redundant bits, in dependence on an encoding scheme used to form the literal value. As a particular example, a form of triangular encoding could be used to encode both the size and pointer value information within the literal value in such a manner.

There are a number of ways in which the bounds information can be determined from the information specified within the capability generating instruction, once the size information has been determined. However, in one example implementation the bounds information identifies a first bound determined from the pointer value, and a second bound determined from the first bound and the size of the region determined from the limited set of allowable sizes. This provides an efficient mechanism for identifying the bounds information, by using the pointer value to effectively determine the first bound, and then using the size information to determine the second bound from the first bound. How the first bound is determined from the pointer value can be varied dependent on implementation, but in one particular example implementation the first bound is set equal to the pointer value.

In one example implementation, the constraining information may comprise items of metadata, and the limited set of options comprises a limited set of possible values for the items of metadata. Hence, in one example implementation the constraining information may comprise both the earlier-mentioned bounds information and additional items of metadata. The items of metadata can take a variety of forms, but in one example implementation may comprise at least a plurality of permission indications identifying allowable uses of the generated capability, and the limited set of options comprises a limited set of allowed combinations of permissions that may be indicated by the plurality of permission indications. For example, it may be that in most cases the permissions indicate that the associated pointer within the capability can only be used to generate addresses for reading data from memory, or instead may identify that the pointer can be used for performing both read and write accesses. With a limited set of allowed combinations of permissions, then the selection from within that limited set of options can be efficiently encoded within the information provided by the capability generating instruction.

There are many different ways in which the values to be given to the items of metadata can be determined by the capability generation circuitry from the capability generating instruction. For example the capability generating instruction may specify metadata information used by the capability generation circuitry to determine values for one or more of the items of metadata. Such metadata information can be provided in a number of different ways, and in one example implementation may take the form of one or more immediate values, that could for example directly identify the values to be used for associated items of metadata, or identify which of the limited set of options to select. Alternatively different flag values may be specified in the instruction or different variants of the capability generating instruction could be used to identify different metadata defining information.

As an alternative, or in addition, the apparatus may further comprise a control register referenced by the capability generation circuitry to determine values for one or more of the items of metadata. The control register could take a variety of forms, and could in one example implementation be a system configuration register.

As another alternative, or additional, example of how the values for one or more of the items of metadata may be determined, the literal value may, as noted earlier, include a number of redundant bits that are not used to determine the pointer value. In such implementations, the processing circuitry may be arranged to determine values for one or more of the items of metadata from information provided within the redundant bits of the literal value.

The way in which the values for the one or more items of metadata are determined based on the information specified by the capability generating instruction can vary dependent on one or more factors. For example, such a determination may be dependent on the current operating mode of the processing circuitry. Hence, irrespective of which of the above options is used to provide the information used to determine the values of items of metadata, the way in which that information is interpreted may depend on the current operating mode of the processing circuitry. As another alternative, if a control register is referenced by the capability generation circuitry, then that control register may provide information that differs dependent on the current operating mode of the processing circuitry.

It should be noted that all of the above different examples of how the values for the items of metadata may be determined could be used independently, or in combination. For instance, one or more items of metadata may have their values determined using one technique, whilst other items of metadata may have their values determined using one of the other techniques.

As noted earlier, one of the types of metadata that may be provided within the generated capability can comprise a plurality of permission indications. In one example implementation, the capability generation circuitry may be arranged to determine the combination of permissions to indicate by the plurality of permission indications in dependence on a type of the generated capability. In particular, it may be that the limited set of permission combinations that is appropriate may be dependent on the type of capability being generated, and accordingly by taking the type of the generated capability into account, the information provided in order to determine the combination of permissions can be interpreted differently, dependent on the type of capability being generated.

There are a number of ways in which the type of the generated capability may be determined. For example, the capability generating instruction will typically specify a destination capability storage element into which the generated capability is to be stored, and the capability generation circuitry may be arranged to infer the type of the generated capability from the specified destination capability storage element. For instance, the destination capability storage element may be a general purpose capability storage element, or may be a program counter capability storage element, and the determined combination of permissions may be dependent on whether a general purpose capability is being generated or a program counter capability is being generated.

For example, for a general purpose capability it may typically be the case that an executable permission will not be set, whereas for a program counter capability the executable permission may be set. In particular, the executable permission bit can indicate whether the capability can be used to generate memory addresses for instructions to be fetched and executed, and such a permission may typically be appropriate for a program counter capability, but may not be appropriate for general purpose capabilities generated using the above described techniques.

Typically the processing invoked when executing the capability generating instruction will terminate with the storing of the generated capability within the specified destination capability storage element. However, in one example implementation, when the specified destination capability storage element is a program counter capability storage element used to store a program counter capability, the processing circuitry may be arranged, once the generated capability has been stored into the program counter capability storage element, to also cause program execution to branch to a target instruction identified using the generated capability. This can improve code density by avoiding the need to specify a subsequent branch instruction following the capability generating instruction.

If desired, the above described capability generating functionality can be limited to specific types of capability. By way of example, in one implementation the use of such capability generating instructions to generate program counter capabilities could be prevented. By way of specific example, the capability generation circuitry may be arranged to trigger a fault if the specified destination capability storage element for the capability generating instruction is a program counter capability storage element.

In one example implementation, the capability generation circuitry can be arranged to generate multiple capabilities in response to a single instance of the capability generating instruction. Hence, when the capability generating instruction is executed, the capability generation circuitry may produce not only the above referenced generated capability, but also one or more further generated capabilities. For each further generated capability, the capability generation circuitry may be arranged to determine the pointer value for that further generated capability from an associated literal value obtained from an associated location in the literal pool that is offset from the location identified by the capability generating instruction. Hence, the capability generating instruction may still identify the location of a single literal value, with that literal value being used to determine the pointer value for the first generated capability, but the locations of the literal values to be used for each of the further generated capabilities can then be inferred from the location determined for the literal value for the first generated capability. The offsets could be predetermined so that they do not need to be specified by the capability generating instruction, or alternatively information about the offsets could be encoded within the instruction if desired.

There are a number of ways in which the constraining information for the various generated capabilities produced in response to the single instance of the capability generating instruction could be inferred, but in one example implementation the capability generation circuitry is arranged to produce the generated capability and each further generated capability with the same constraining information. Hence, the encoding space within the instruction required to specify the constraining information does not need to increase in situations where the execution of the capability generating instruction will result in the production of multiple capabilities.

With regards to the destination capability storage elements into which each of the generated capabilities is to be stored, then the capability generation circuitry can be arranged to derive, from the specified destination capability storage element that is used as a destination for the initial generated capability, an associated destination capability storage element for each further generated capability. For example, the required destination capability storage elements may form a consecutive sequence of capability storage elements starting from the specified destination capability storage element. As an alternative approach, if desired, each destination capability storage element could be explicitly identified in the instruction.

The processing circuitry can be arranged to operate in a number of different operating modes. These operating modes can take a variety of forms. For example, the processing circuitry may be able to operate in a secure domain or a less secure domain and/or within a privileged state or an unprivileged state, and indeed there may be more than two domains and/or more than two states that could be adopted by the processing circuitry. The current operating mode of the processing circuitry may be dependent on both the domain and the processing state that the processing circuitry is operating in.

If desired, the operation of the capability generation circuitry may be dependent on a current operating mode of the processing circuitry. This could for example be used to restrict the ability to generate capabilities to certain operating modes of the processing circuitry. Accordingly, by way of example, a fault may be raised if the capability generation circuitry is triggered to execute a capability generating instruction whilst the processing circuitry is in a particular operating mode for which generation of capabilities in this manner is prohibited.

As other examples of how the operation of the capability generation circuitry could be made dependent on a current operating mode, the form of the metadata generated may vary dependent on the operating mode. For example, the metadata may include information indicative of the operating mode of the processing circuitry at the time the capability was generated, and hence the capability generation circuitry will generate different forms of metadata dependent on the current operating mode of the processing circuitry at the time the capability generating instruction is executed. As a yet further example, the processing circuitry may be able to operate in a capability mode that is constrained by capabilities, and a further mode that is not constrained by capabilities, and the manner in which the capability generation circuitry operates in response to capability generating instructions may be dependent on whether the processing circuitry is operating in the capability mode or not.

Particular examples will now be described with reference to the Figures.

The techniques described herein can be employed in a variety of data processing systems, and in association with different types of processing circuitry within such systems. For example the techniques can be used in association with processing circuitry taking the form of a central processing unit (CPU), but could alternatively be employed in association with other processing circuitry, such as a direct memory access (DMA) controller, an encryption accelerator, etc. Purely by way of illustrative example in the following FIG.

1, a processing pipeline of a CPU will be considered as an example of processing circuitry within which the described techniques can be used.

FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some example implementations. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted taken, or from the next sequential address if the branch is predicted not taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (pops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some example implementations may support in-order processing so that instructions are issued for execution in an order corresponding to the program order in which instructions were fetched from the L1 instruction cache 20. Other example implementations may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer 52 (TLB) may be provided for translating the virtual addresses used by the pipeline 4 into physical addresses used for accessing the cache or memory. For example, the TLB 52 may include a number of entries each specifying a virtual page address of a corresponding page of the virtual address space and a corresponding physical page address to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information specifying access permissions such as indicating whether certain pages of addresses are accessible in certain modes of the pipeline 4. In some example implementations, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While FIG. 1 shows a single level TLB 52, it will be appreciated that a hierarchy of TLBs may be provided so that a level one (L1) TLB 52 may include TLB entries for translating addresses in a number of recently accessed pages and a level two (L2) TLB may be provided for storing entries for a larger number of pages. When a required entry is not present in the L1 TLB then it can be fetched from the L2

TLB, or from further TLBs in the hierarchy. If a required entry for a page to be accessed is not in any of the TLBs then a page table walk can be performed to access page tables in the memory 50. Any known TLB management scheme can be used in the present technique.

Also, it will be appreciated that some systems may support multiple levels of address translation so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

The apparatus may be provided with capability storage elements for storing capabilities (which may be referred to as bounded pointer storage elements when the capability takes the form of a bounded pointer having associated range information indicative of an allowable range of addresses when using the pointer). Each capability/bounded pointer storage element could be a register, or a memory location in general purpose memory, for example a location on a stack memory.

As shown in FIG. 1, the apparatus 2 may have a set of bounded pointer registers 60 used as the bounded pointer storage elements. Whilst the set of bounded pointer registers is shown in FIG. 1 as being physically separate to the set of general purpose data registers 40, in one example implementation the same physical storage may be used to provide both the general purpose data registers and the bounded pointer registers.

Each bounded pointer register 60 includes a pointer value 62 that may be used to determine an address of a data value to be accessed, and range information 64 specifying an allowable range of addresses when using the corresponding pointer 62. The bounded pointer register 60 may also include restrictions information 66 (also referred to herein as permissions information) which may define one or more restrictions/permissions on the use of the pointer. For example the restriction 66 could be used to restrict the types of instructions which may use the pointer 62, or the modes of the pipeline 4 in which the pointer can be used. Hence, the range information 64 and restriction information 66 may be considered to define capabilities within which the pointer 62 is allowed to be used. When an attempt is made to use a pointer 62 outside the defined capabilities, an error can be triggered. The range information 64 can be useful for example for ensuring that pointers remain within certain known bounds and do not stray to other areas of the memory address space which might contain sensitive or secure information. In an example implementation where the same physical storage is used for both general purpose data registers and bounded pointer registers, then the pointer value 62 may for example be stored within the same storage location as used for a corresponding general purpose register.

Figure 2:
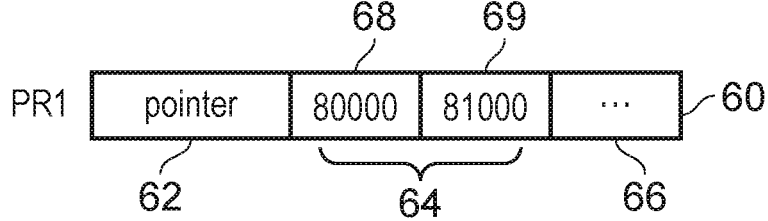
FIG. 2 shows examples of types of instruction for which an error may be triggered if there is an attempt to set or access a pointer value within a set of bounded pointer storage elements, where that pointer value is used to specify an address outside the range indicated by the associated range information.

FIG. 2 shows an example of types of instructions for which the allowable range is used to protect against unauthorised access to data or instructions. As shown in the top part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PRI and the address determined from the pointer 62 is outside this range.

For example, as shown in part A of FIG. 2, in some systems an error may be triggered if there is an attempt to set the value of the pointer 62 in the pointer register 60 to a value lying outside the range specified by the range information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range information 64 could be set in different ways. For example secure code, or an operating system or hypervisor, may specify the range allowed for a given pointer. For example, the instruction set architecture may include a number of instructions for setting or modifying the range information 64 for a given pointer 62, and execution of these instructions could be restricted to certain software or certain modes or exception states of the processor 4. Any known technique for setting or modifying the range information 64 could be used.

In addition to the set of bounded pointer storage elements 60 that may be used at the execute state 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60.

Figure 3:
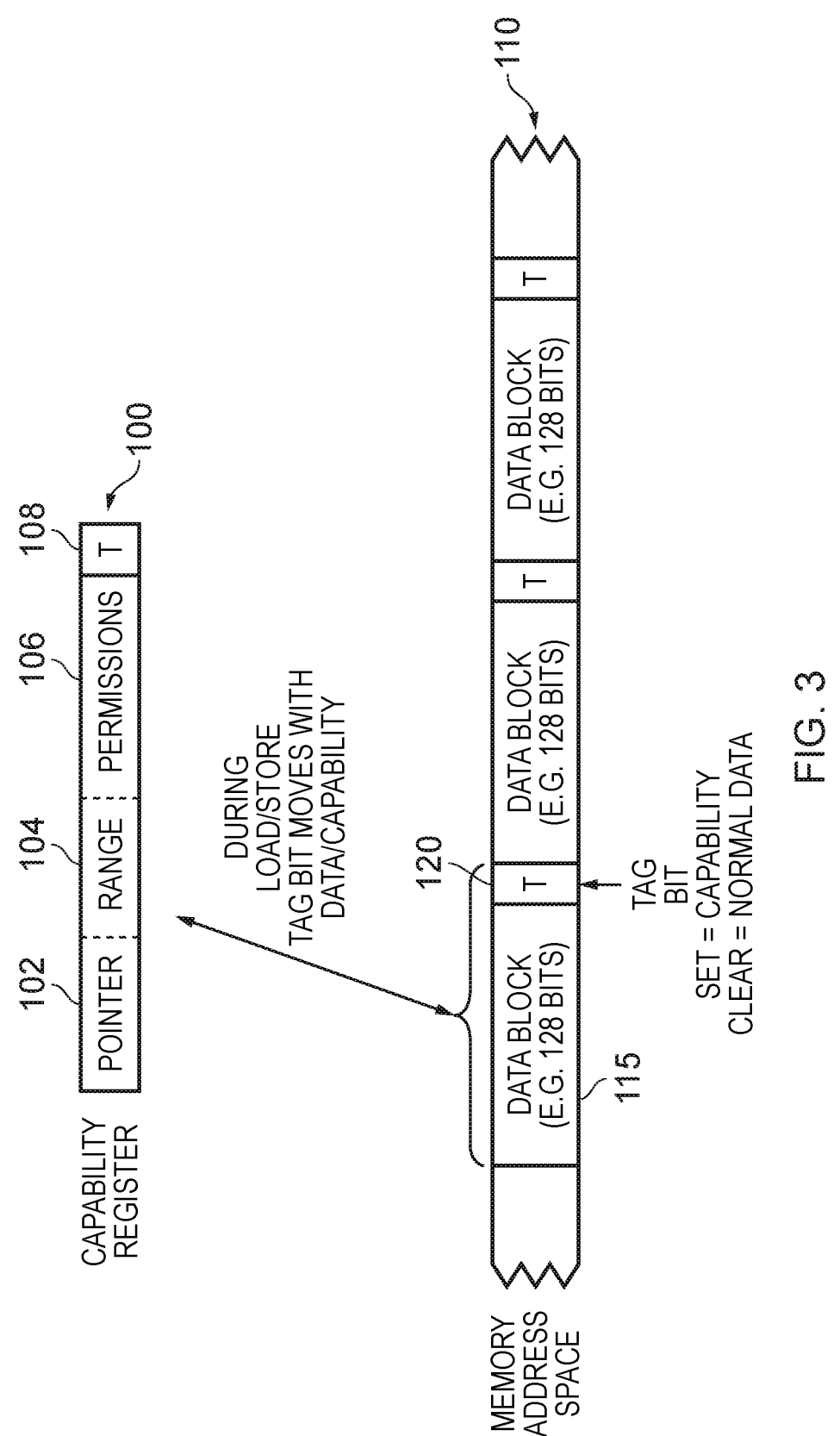
FIG. 3 illustrates the use of a tag bit in association with bounded pointers, in accordance with one example implementation.

FIG. 3 schematically illustrates how a tag bit is used in association with individual data blocks to identify whether those data blocks represent a capability (i.e. a bounded pointer and associated restrictions information), or represent normal data. In particular, the memory address space 110 will store a series of data blocks 115, which typically will have a specified size. Purely for the sake of illustration, it is assumed in this example that each data block comprises 128 bits, but in other example implementations different sized data blocks may be used, for example 64-bit data blocks when capabilities are defined by 64 bits of information. In association with each data block 115, there is provided a tag field 120, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on implementation, but purely by way of illustration, in one example implementation if the tag bit has a value of 1, it indicates that the associated data block is a capability, and if it has a value of 0 it indicates that the associated data block contains normal data.

When a capability is loaded into one of the bounded pointer registers 60 (also referred to herein as a capability register), such as the capability register 100 shown in FIG. 3, then the tag bit moves with the capability information. Accordingly, when a capability is loaded into the capability register 100, the pointer 102, range information 104 and restrictions information 106 (hereafter referred to as the permissions information) will be loaded into the capability register. In addition, in association with that capability register, or as a specific bit field within it, the tag bit 108 will be set to identify that the contents represent a capability. Similarly, when a capability is stored back out to memory, the relevant tag bit 120 will be set in association with the data block in which the capability is stored. By such an approach, it is possible to distinguish between a capability and normal data, and hence ensure that normal data cannot be used as a capability.

Returning to FIG. 1, the apparatus may further provide one or more control registers for storing certain control information. In accordance with the techniques described herein, the apparatus is able to generate capabilities/bounded pointers in response to executing a capability generating instruction, and in one example implementation may refer to one or more of the control registers when determining suitable constraining information for that generated capability.

Figure 4:
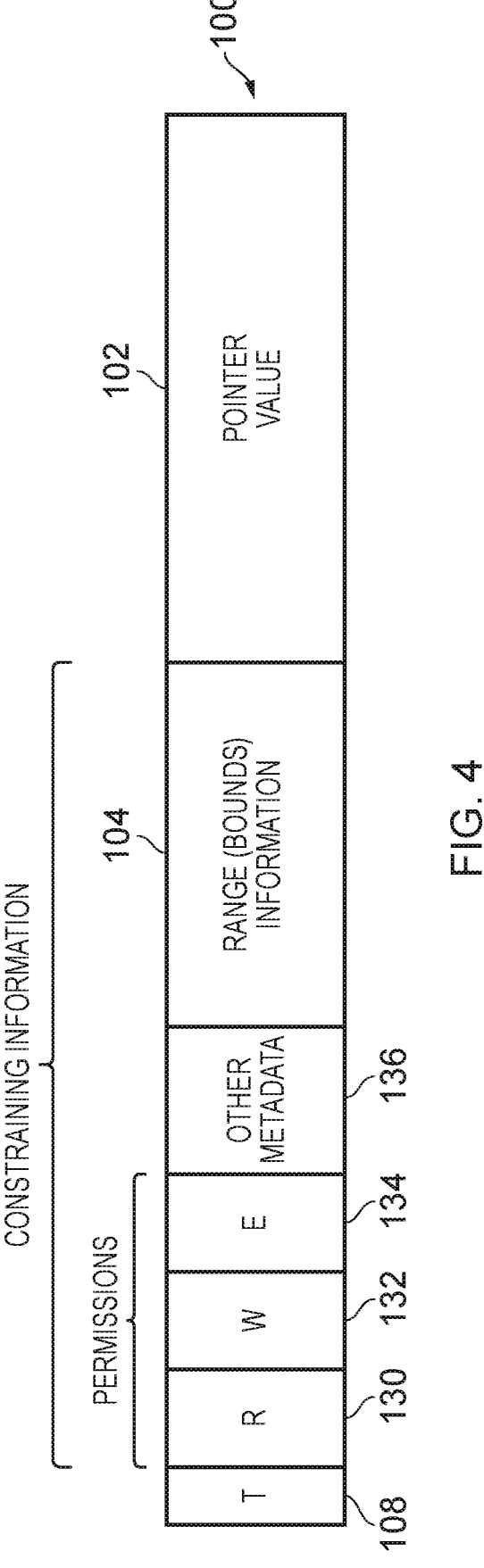
FIG. 4 schematically illustrates the form of capability that may be used in accordance with the techniques described herein, in accordance with one example implementation.

The capabilities can take a variety of forms. In the example shown in FIG. 4, the capability 100 contains a pointer value 102 and associated constraining information. The constraining information in this example includes some range information 104 (also referred to herein as bounds information). A set of permissions can also be provided as part of the constraining information of the capability, and in addition the capability may include (directly or in association therewith) the earlier-described tag bit 108 which can be set or cleared to identify whether the corresponding block of data is to be treated as a capability or not.

Permissions specified for the capability can vary dependent on implementation, but in one example implementation the permissions include a read permission bit 130 whose value indicates whether the capability can be used to generate memory addresses for read accesses, a write permission bit 132 whose value indicates whether the capability can be used to generate memory addresses for write accesses, and an execute permission bit 134 whose value indicates whether the capability can be used to generate memory addresses of instructions to be fetched and executed.

Such permissions information can be considered as metadata information for the capability. Other metadata information 136 can also be identified within the capability if desired. Purely by way of example, such metadata may indicate whether the capability is considered immutable or not. Whilst such information can be directly specified as extra information in the capability, it can in some example implementations be inferred from the state of other information already provided within the capability. For example, in one particular implementation, when the execute bit is set, the capability is considered to be immutable, in that the information specified by the capability cannot be modified without clearing the tag bit (effectively invalidating the capability), except through the normal incrementing of pointer values that may result from instruction execution.

As another example of other metadata information 136 that may be included, such metadata may include a level of trust indication, for example to indicate an operating mode that the processing circuitry was operating in when that capability was generated. The level of trust can be directly encoded into the field 136 of the capability 100, or alternatively the level of trust indication can provide an identifier that is used to indicate a memory address containing the level of trust information. Such an identifier could directly indicate the memory location of the level of trust information, or it could for example specify an offset that can be applied to an address stored in a global register in the system in order to identify the location containing the level of trust information.

Figure 5:
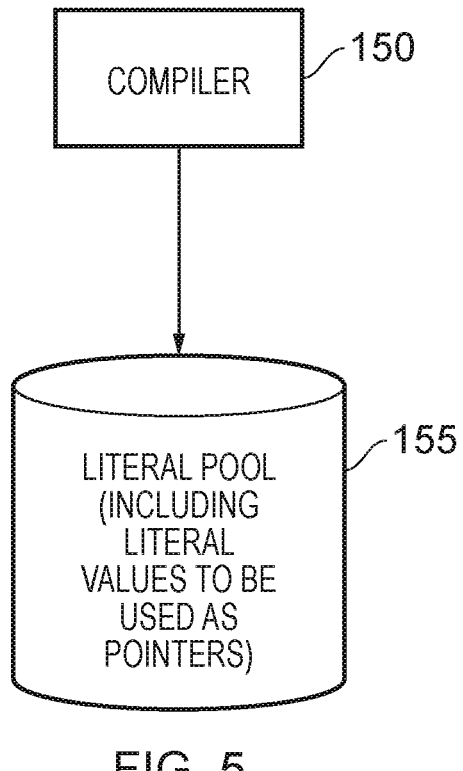
FIG. 5 schematically illustrates how a compiler may be used to generate literal values for storing within a literal pool, in accordance with one example implementation.

FIG. 5 is a diagram schematically illustrating how a compiler 150 may be arranged to populate a literal pool 155 in memory when compiling program code. In particular, when compiling the code to be executed on the processing circuitry, the compiler 150 can store a variety of different literal values within the literal pool 155. As discussed earlier, prior to the techniques described herein, such a compiler may also have generated a number of compiler-generated capabilities that could be stored within the literal pool, so that those capabilities are then available for loading into capability registers by the processing circuitry during execution of the code. However, as noted earlier, the provision of such compiler-generated capabilities within the literal pool can significantly increase the overall code size (consisting of the compiled code and the associated literal pool), and it would desirable to reduce the overall code size, particularly in memory constrained devices where non-volatile storage is at a premium.

The inventors noted that a significant number of the capabilities that may typically be generated by a compiler only access small data structures, for example global variables, peripherals, control registers, etc., and hence there is only a limited number of typical sizes used to express the bounds information for such capabilities. Further, it was noted that only a limited number of combinations of possible permission bits are typically used for such capabilities. In accordance with the techniques described herein, for such capabilities the compiler can be arranged not to generate those capabilities at compilation time, but instead to store a literal value within the literal pool 155 that can be used to determine the pointer value for each such capability. Storing of such a literal value, rather than the full capability, can significantly reduce the size requirements for the literal pool, and hence reduce the overall code size.

Further, when using the techniques described herein, the processing circuitry can be arranged in due course to generate the required capabilities using those literal values stored within the literal pool, without compromising the trust in such capabilities. In particular, a capability can in due course be created by the processing circuitry by executing a particular capability generating instruction (the instruction can also be issued by the compiler if desired) that uses one of the literal values within the literal pool (which can hence be trusted), and whose constraining information is selected from a limited set of possible options using information directly derivable from the instruction (and hence which can also be trusted). Since the intent of the program that has been compiled can be trusted, then a capability generated in this manner can also be trusted, and accordingly capabilities generated in this manner can be trusted just as highly as capabilities that had been generated by the compiler itself and stored within the literal pool.

Figure 6:
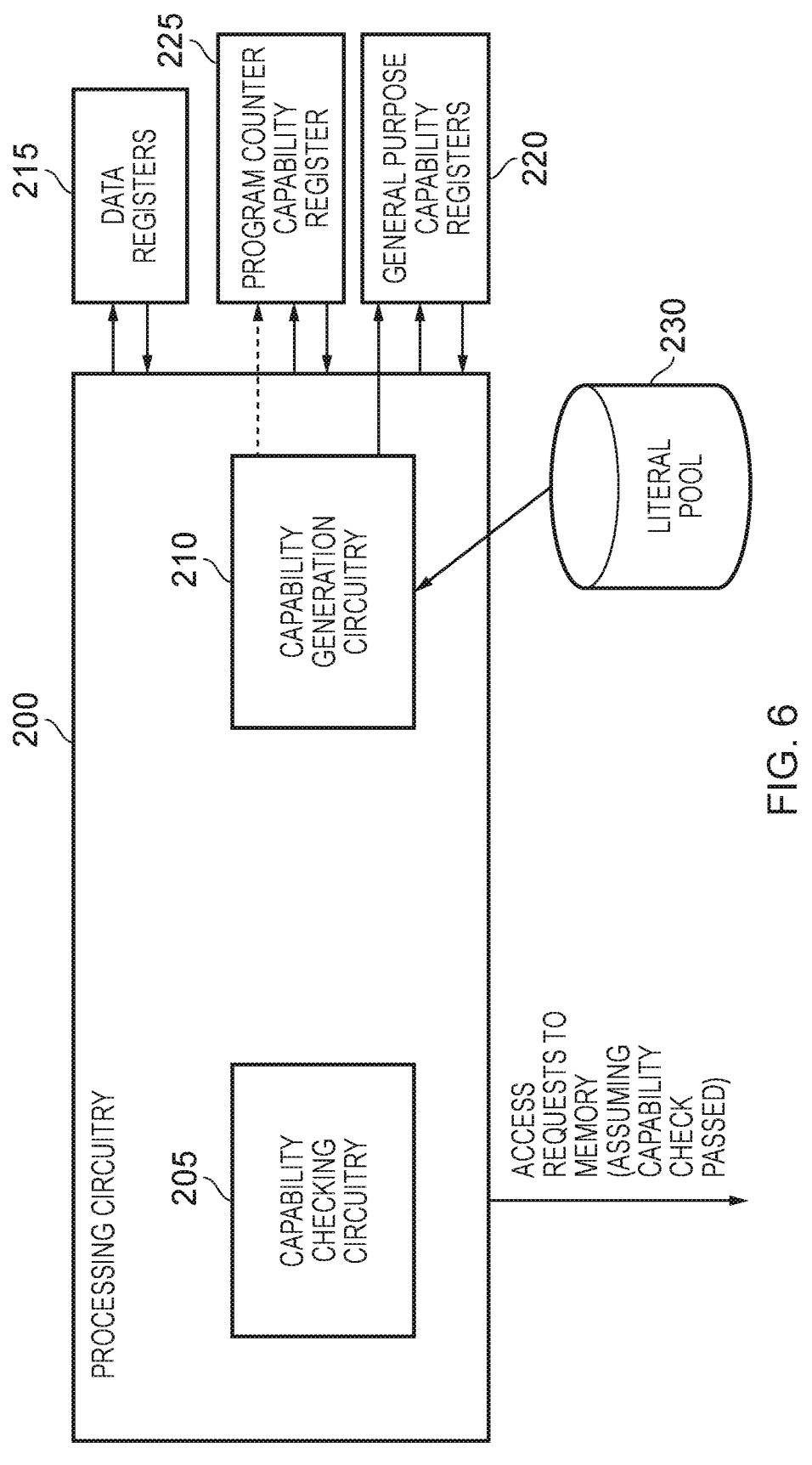
FIG. 6 in a block diagram illustrating components that may be provided within an apparatus in accordance with one example implementation.

FIG. 6 is a block diagram illustrating components that may be provided within an apparatus in accordance with one example implementation. In this example, processing circuitry 200 is provided for executing a sequence of instructions, and during performance of the data processing operations specified by those instructions the processing circuitry may access general purpose data registers 215, general purpose capability registers 220 and the program counter capability register 225. The processing circuitry 200 can take a variety of forms, but could for example take the form of the processor pipeline 4 shown in FIG. 1.

In the example shown in FIG. 6, capability generation circuitry 210 is provided, that is responsive to the processing circuitry executing a capability generating instruction that identifies a location in a literal pool 230 of the memory, to retrieve a literal value from the location in the literal pool, and to produce a generated capability in which the pointer value of the generated capability is determined from the literal value. The associated constraining information for the generated capability is then selected by the capability generation circuitry from a limited set of options in dependence on information that is specified by the capability generating instruction. The generated capability can then be written by the capability generation circuitry 210 into an identified destination capability register (typically that identified destination register being specified by the capability generating instruction). This may for example be one of the general purpose capability registers 220, but in some implementations may also in some instances be the program counter capability register 225.

The capability generation circuitry 210 may be a separate component to the processing circuitry 200, but in the example shown in FIG. 6 is considered to be provided by the processing circuitry 200.

As also shown in FIG. 6, capability checking circuitry 205 may also be provided, either as a separate component or, as shown in FIG. 6, as part of the processing circuitry 200. The capability checking circuitry 205 is employed, when an access request is being considered whose memory address is generated using a given capability, to perform a capability check operation to determine whether that access request is permitted based on the constraining information identified by the given capability. Hence the capability check may involve, for example, reference to the range and permission information of the capability in order to determine whether the access is allowed to proceed or not. In the event of a fail of the capability check, a failure indication can be provided to the processing circuitry, and this can take a variety of forms, for example a fault signal. However, if the capability check is passed, then the access request can be issued to memory. In some implementations, one or more further checks may be performed before the access is allowed to proceed, for example within components such as a memory management unit (MMU), a memory protection unit (MPU), a security attribute unit (SAU), or a combination of those components.

Figure 7:
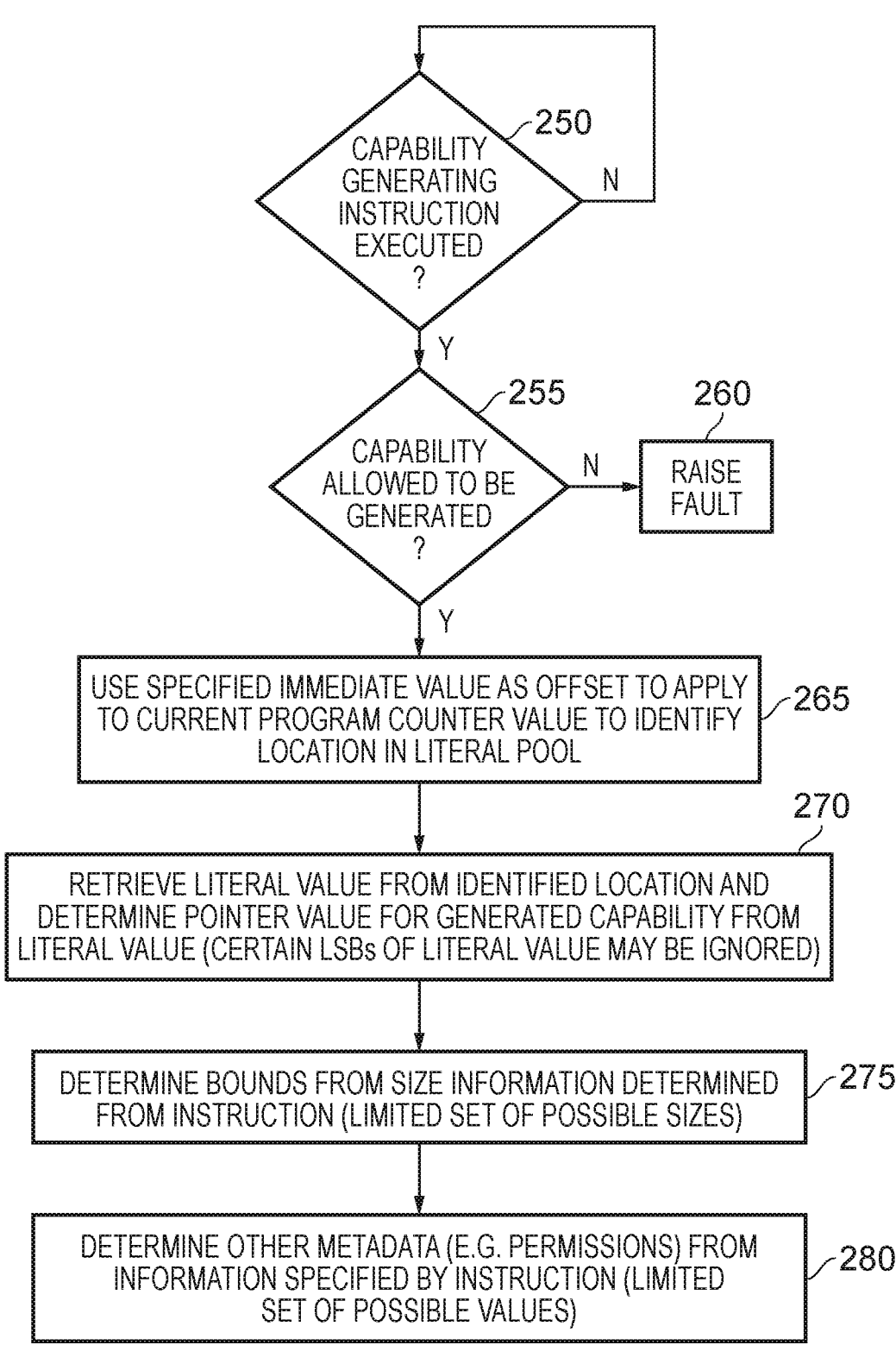
FIG. 7 is a flow diagram illustrating steps performed in response to a capability generating instruction in accordance with one example implementation.

FIG. 7 is a flow diagram illustrating steps performed by the capability generation circuitry 210 when a capability generating instruction is executed by the processing circuitry 200. When at step 250 it is determined that a capability generating instruction is being executed, it is determined at step 255 whether a capability is allowed to be generated, taking into account any criteria that may constrain the ability to generate capabilities. By way of example, the techniques described herein, whereby the capability generation circuitry 210 is used to generate capabilities in response to the capability generating instruction, may be restricted to certain operating modes of the processing circuitry, and if the processing circuitry is not within one of the allowed operating modes it may be determined at step 255 that capabilities cannot be generated, and in that case a fault may be raised at step 260. As another example, the ability to generate capabilities may be limited to certain types of capabilities. For example, it may be prohibited in some implementations to generate a capability using the above described mechanism if that capability is to be used as a program counter capability, and again a fault may be raised at step 260 if there is an attempt to generate a program counter capability in such situations.

However, assuming at step 255 it is determined that the capability is allowed to be generated, then at step 265 an immediate value specified by the capability generating instruction is used as an offset to apply to the current program counter value to identify a location within the literal pool. At step 270, the literal value at that identified location is retrieved from the literal pool and is used to determine the pointer value for the generated capability. In some instances the entire literal value may be used "as is" to form the pointer value, but in other implementations steps may be taken to derive the pointer value from the retrieved literal value. By way of specific example, it may be that a certain number of least significant bits of the literal value can be ignored for the purposes of generating the pointer value, due to some alignment requirements of the pointer value being generated. As will be discussed in more detail later, these ignored least significant bits can be repurposed, if desired, to provide other information used in generating the capability in some example implementations.

At step 275, the bounds information for the capability being generated can be determined from size information derived from information provided by the instruction. In particular, information provided by the instruction can be used to encode a size within a limited set of possible sizes, and hence the capability generation circuitry can determine which size to use for the bounds based on such information. The first bound can then be determined with reference to the pointer value identified at step 270, for example by being set equal to that pointer value. Then the second bound can be determined by applying the determined size to the first bound in order to create the second bound.

As indicated at step 280, other metadata, for example the earlier mentioned permission bits, may be determined from information specified by the instruction. Again a limited set of possible values is available, and hence the information provided by the instruction can be used to determine which combination of values from the limited set of possible values to use.

The capability generating instruction can take a variety of forms, but in one specific example has the following format:

LDRCC Cd, <label>, #sz

Hence, in this example the capability generating instruction is a capability creating load instruction that specifies a destination capability register Cd, provides an immediate value (referred to as the "label") that is used to identify the location within the literal pool, and specifies size information (#sz) that is used to determine the size of the permissible range for the generated capability. However this is just one example format that may be used, and other formats can be used, provided that the required information to generate the capability can be derived from the instruction itself, in combination with the literal value retrieved from the literal pool.

Figure 8:
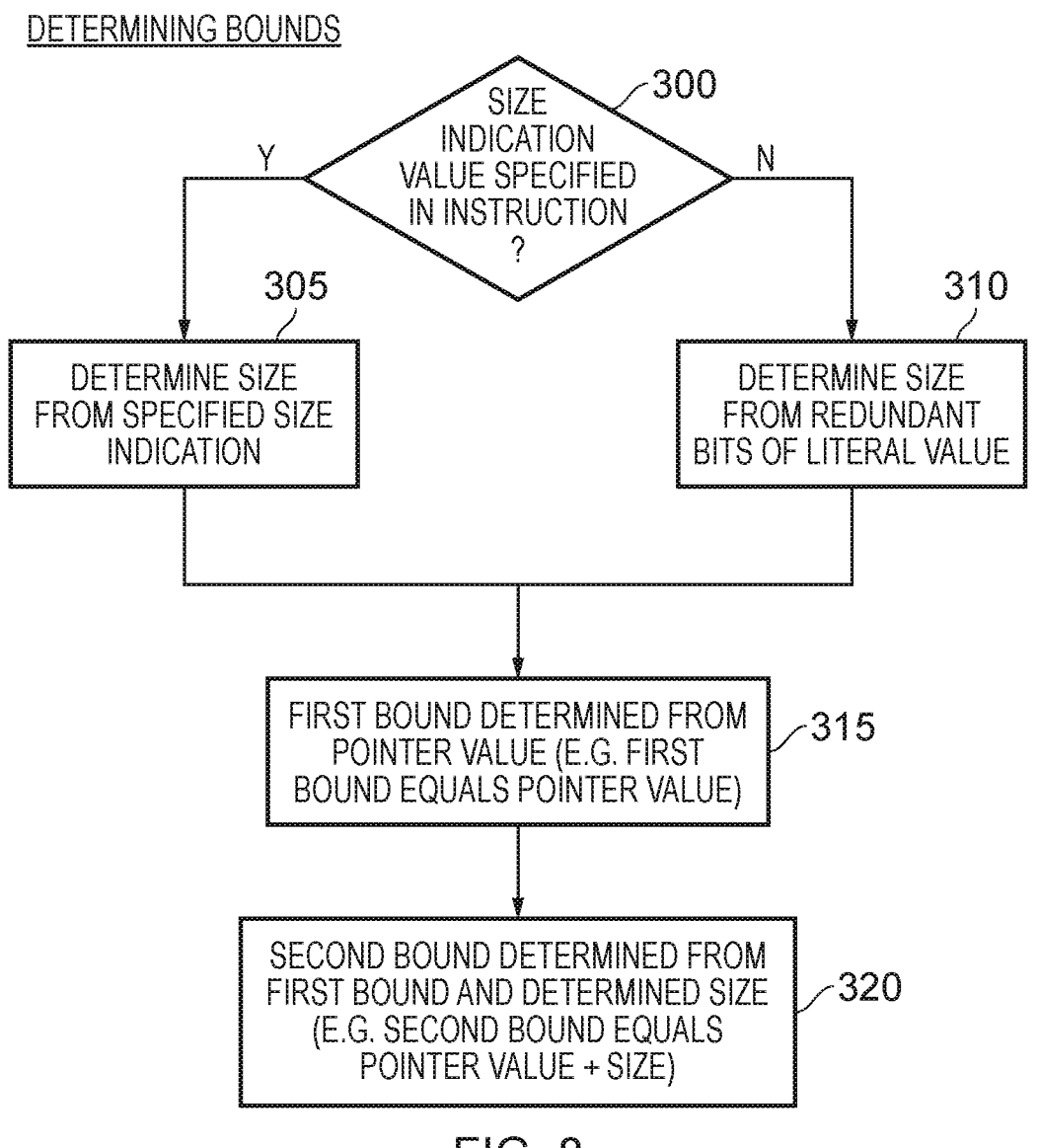
FIG. 8 is a flow diagram illustrating in more detail steps that may be performed in order to implement step 275 of FIG. 7, in accordance with one example implementation.

FIG. 8 is a flow diagram illustrating in more detail the steps that can be implemented at step 275 of FIG. 7 in order to determine the bounds for the generated capability. At step 300, it is determined whether a size indication value is specified directly in the instruction, as for example is the case in the above mentioned LDRCC instruction format. If a size indication value is specified, then the process proceeds to step 305 where the size is determined from the specified size indication. The size indication value could specify the size directly, or could use a suitable encoding scheme to identify the size. For example, the sizes within the limited set of options may vary by powers of 2, and the size indication could indicate the power of 2 to apply. Alternatively, the size indication could specify an offset from a predetermined minimum size indication. Irrespective of how the size indication is formed, it will be appreciated that at step 305 the capability generation circuitry 210 can determine the size of the region associated with the capability from the size indication.

In an alternative implementation the size indication value may not be specified directly in the instruction, and instead as illustrated in FIG. 8 it may be possible to determine the size from redundant bits of the literal value retrieved from memory, as indicated by step 310. In particular, as mentioned earlier, there may be bits within the literal value that are otherwise unused, due to some alignment constraints on the pointer value, and these bits can be repurposed for a number of possible uses, one of which is to encode the size information. That information can be encoded within the redundant bits of the literal value in much the same way as if the size indication was specified directly in the instruction, and hence can take any of the forms discussed earlier with reference to step 305.

As a yet further alternative, not specifically illustrated in FIG. 8, it may be the case that the size is fixed, and accordingly no size indication value needs to be specified. Instead, the bounds can be determined directly by identifying the first bound, and then applying the fixed size to determine from the first bound the location of the second bound.

Irrespective of which of steps 305 or 310 is performed, the process then proceeds to step 315 where the first bound is determined from the pointer value. Any suitable technique can be used to determine the bound from the pointer value, and hence for example the first bound may be at some fixed offset from the pointer value. However, in one particular example implementation the first bound is set equal to the pointer value.

Then, at step 320 the second bound is determined from the first bound and the determined size. By way of example, the second bound can be set equal to the pointer value plus the determined size. Once the first bound and the second bound have been set, it will be appreciated that the range information for the capability has at that point been determined.

Figure 9:
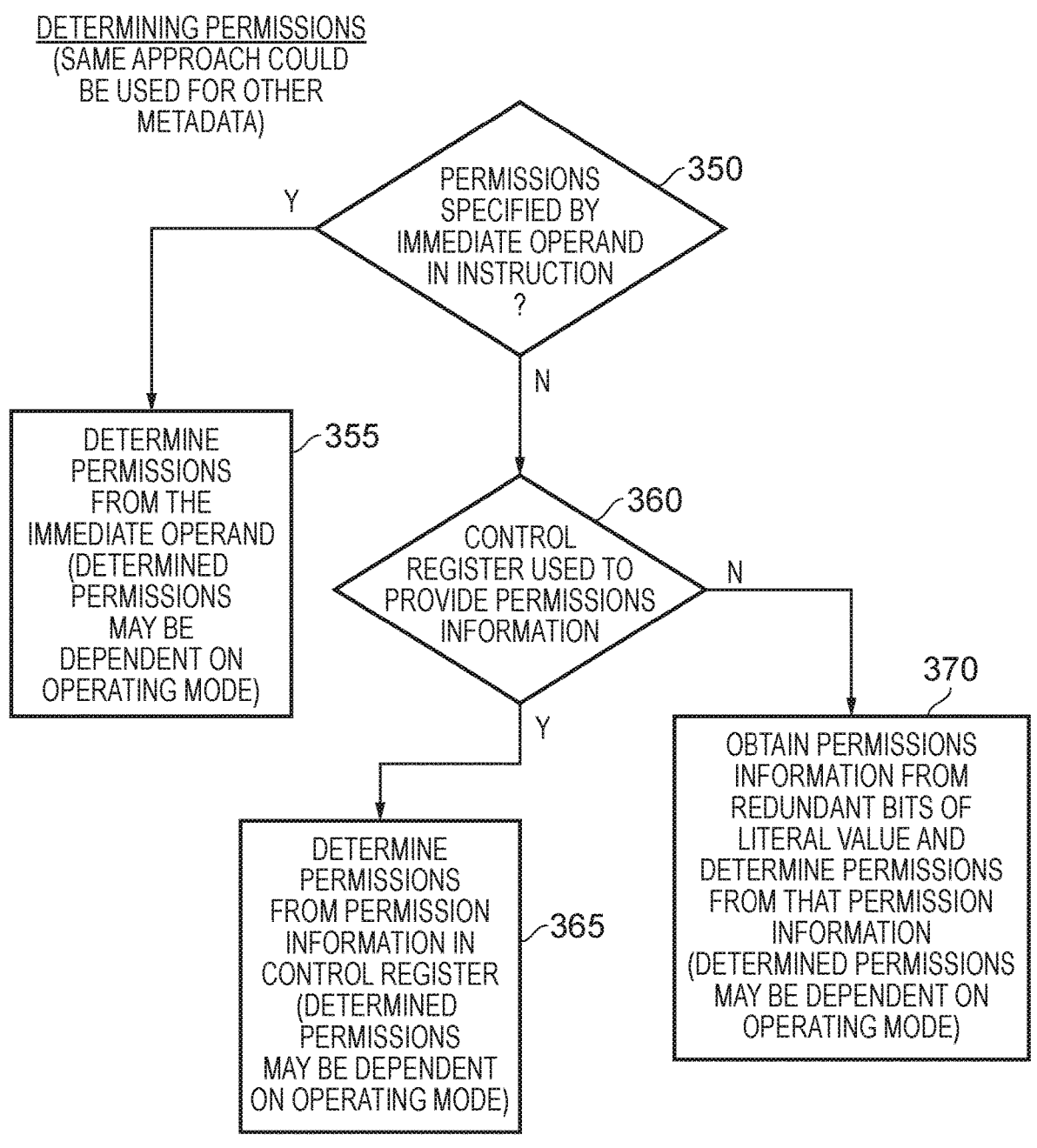
FIG. 9 is a flow diagram illustrating how the permissions of the generated capability may be determined in accordance with one example implementation.

FIG. 9 is a flow diagram illustrating various different ways in which the permission bit values may be determined. The same type of approach can also be used for any other metadata that may be provided as part of the constraining information of the capability. At step 350, it is determined whether the permissions are specified by an immediate operand in the instruction. For example, the permission bit values could be directly specified within the instruction by such an immediate operand if desired. Alternatively, the value of the immediate operand may be encoded in a way that can be used to determine which of the possible limited set of permission combinations is to be used, which may require less bit space within the instruction than if the permissions are specified directly by the immediate operand.

If the permissions are specified by the immediate operand, then the process proceeds to step 355 where the capability generation circuitry 210 determines the permissions from that immediate operand.

If at step 350 it is determined that the permissions are not specified by an immediate operand in the instruction, it is then determined at step 360 whether a control register should be used to provide the permission information. In particular, in one example implementation, at least for some generated capabilities the required permission information may be stored within one or more control registers 90. If it is determined that the control register should be referred to for the permissions information, then the process proceeds to step 365 where the permissions are determined from the permission information in the control register. As with the immediate operand in the instruction, such information in the control register may directly identify the permission information, or may alternatively provide an encoding used to identify which of the limited set of combinations of permissions to be used.

If at step 360 it is determined that a control register is not to be used to provide the permissions information, then at step 370 the permissions information is obtained from redundant bits of the literal value retrieved from the literal pool, and then the permissions are determined from that permission information. Hence, in some instances, rather than specifying an immediate operand or getting the permissions information from a control register, that permissions information may be encoded within redundant bits of the literal value that are not required to form the pointer value. As with the earlier described examples, the permission values may be specified directly within those bits, or those bits may provide an encoding that is used to determine which of the possible combinations of permission bits is to be used.

As indicated in FIG. 9, irrespective of which mechanism is used, in situations where the permissions information provides an encoding from which the suitable combination of permissions can be determined from the limited set of options, then the determined permissions may be dependent on the operating mode of the processing circuitry at the time the capability is generated. For example, if the processing circuitry is operating in a particular privileged mode of operation, the permissions bits determined from a particular value of permission information may be different to the permission bits that would be determined had the processing circuitry been operating in a less privileged mode. Further, the permission bits determined from the permission information may depend on the type of capability being generated, and hence for example the determined permission bits may be different depending on whether a general purpose capability is being generated or a program counter capability is being generated.

FIG. 10 is a diagram illustrating various different operating modes of the processing circuitry that may be provided within the system. As shown in FIG. 10, the processing circuitry may be arranged to operate in a secure domain and a less secure domain. In addition, or alternatively, the processing circuitry may be arranged to execute program code in a plurality of different states, and in the example of FIG. 10 may be arranged to execute program code in a privileged state or an unprivileged state. The levels of privilege and the different security domains can be viewed as being orthogonal levels of trust, and hence different combinations of domain and state can be used to define different operating modes of the processing circuitry. As discussed earlier, the way in which the constraining information for the generated capability is determined may be dependent on which operating mode the processing circuitry is in. Further, if desired, the ability to generate capabilities using the techniques described herein may be limited to one or more of the operating modes, with for example a fault being generated if an attempt is made to generate a capability in one of the non-authorised operating modes.

Figure 11:
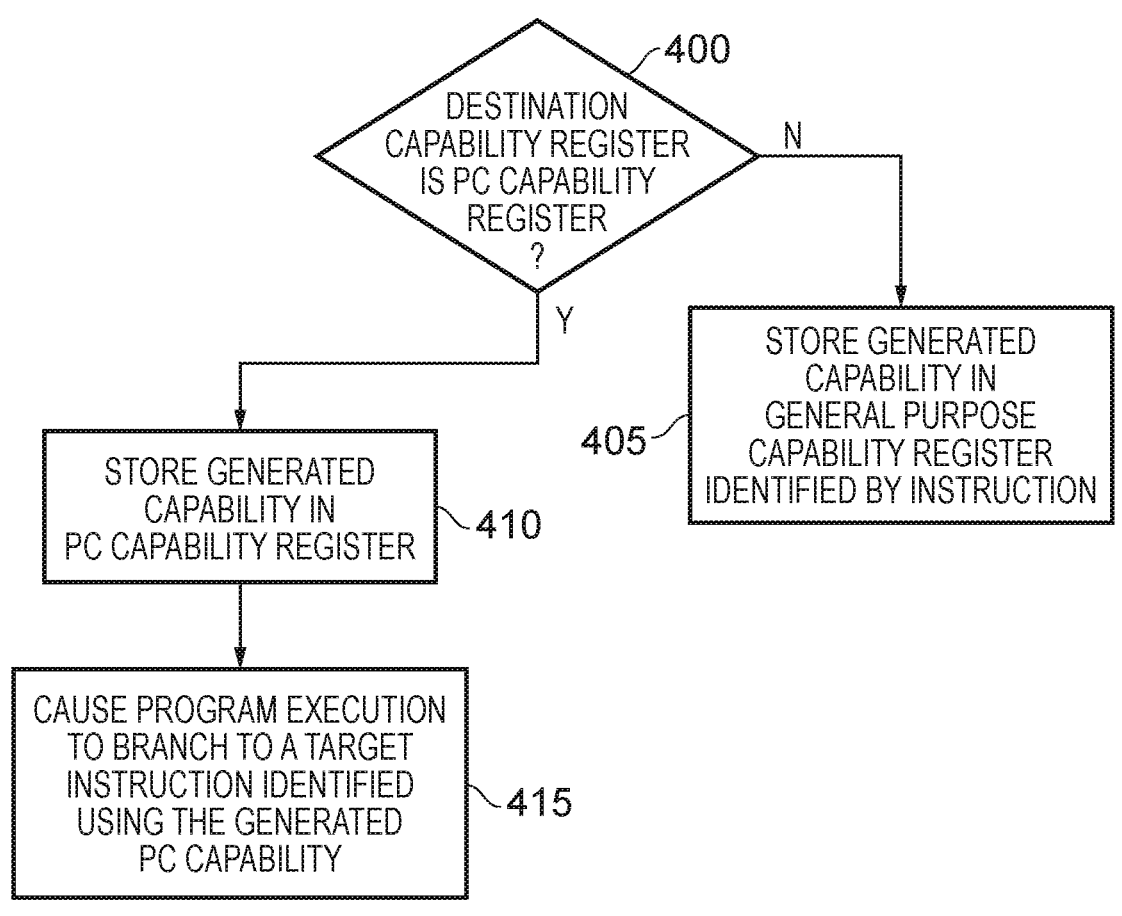
FIG. 11 is a flow diagram illustrating how the processing performed when generating a capability may be dependent on the type of capability being generated, in accordance with one example implementation.

FIG. 11 is a flow diagram illustrating how, in one example implementation, the steps taken when generating a capability may depend on whether the capability being generated is a program counter capability or a general purpose capability. At step 400, it is determined whether the destination capability register specified by the capability generating instruction is a program counter capability register. If not, then the process proceeds to step 405 where the capability is generated in the manner discussed earlier and stored within the target general purpose capability register identified by the instruction.

However, in one example implementation, if the destination capability register is the program counter capability register, then in addition to generating the capability in the above described manner and storing the generated capability in the program counter capability register at step 410, an additional step 415 is also performed, whereby program execution is caused to branch to a target instruction identified using the generated program counter capability. This avoids the need to provide a separate branch instruction to branch to that target instruction following the generation of the program counter capability.

If desired, then the capability generation circuitry 210 can be arranged to generate multiple capabilities in response to execution of a single capability generating instruction, as illustrated in FIG. 12. For example, a type of capability generating instruction may be specified that identifies that multiple capabilities should be generated when that capability generating instruction is executed. In such an instance, when it is determined at step 450 that that particular form of capability generating instruction is being executed, the process proceeds to step 455, where the first capability is generated using the earlier described process of FIG. 7. At step 460, each subsequent capability is then generated using a literal value obtained from a location offset from the location used to obtain the literal value for the first capability. The offset to be used to identify the literal value for each subsequent capability may be predetermined, for example to identify a series of adjacent literal values stored within the literal pool, or alternatively the offset information required to identify the literal values for each subsequent capability may be encoded in some format within the instruction.

In accordance with the example shown in FIG. 12, as indicated at step 460 the same constraining information is used for each of the generated capabilities, and accordingly does not differ between the capabilities generated from the single capability generating instruction.

At step 465, the generated capabilities are stored in a sequence of general purpose capability registers. Typically the first general purpose capability register will be that explicitly identified by the capability generating instruction, and then each of the further general purpose capability registers may be inferred. For example, each subsequent general purpose capability may follow a determined sequence. For instance, a series of adjacent general purpose capability registers, starting with the capability register specified by the capability generating instruction, may be used as the sequence of general purpose capability registers into which the generated capabilities are stored. Alternatively, some sequence defining information may be provided within the instruction, and used to identify each general purpose capability register into which the generated capabilities should be stored. As a yet further example, the instruction could explicitly identify each general purpose destination capability register.

Figure 13:
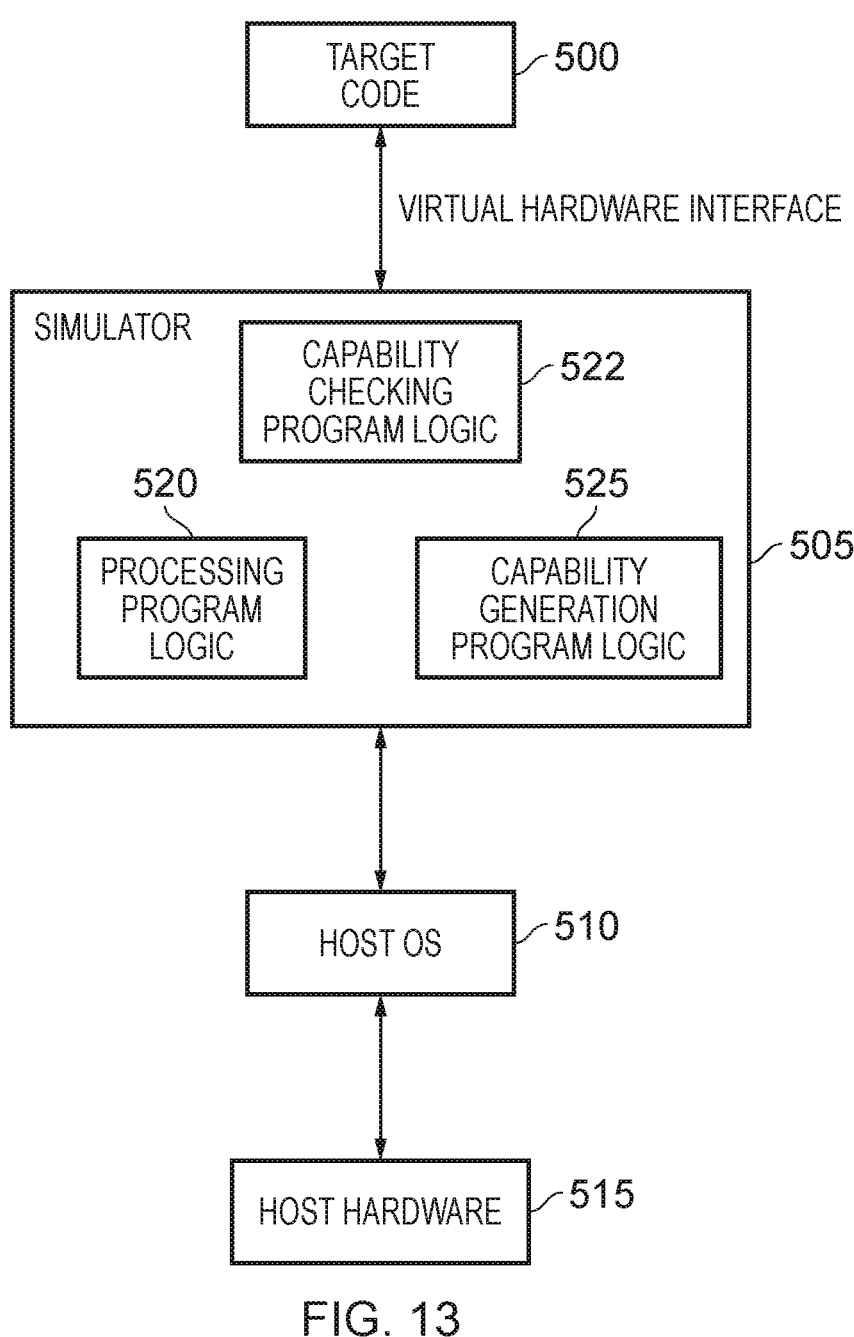
FIG. 13 shows a simulator example that can be used.

FIG. 13 illustrates a simulator implementation that may be used. Whilst the earlier described examples implement the present invention in terms of apparatus and methods for operating specific processing hardware supporting the techniques concerned, it is also possible to provide an instruction execution environment in accordance with the examples described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically a simulator implementation may run on a host processor 515, optionally running a host operating system 510, supporting the simulator program 505. In some arrangements there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990, USENIX Conference, Pages 53 to 63.

To the extent that examples have previously been described with reference to particular hardware constructs or features, in a simulated implementation equivalent functionality may be provided by suitable software constructs or features. For example, particular circuitry may be provided in a simulated implementation as computer program logic. Similarly, memory hardware, such as register or cache, may be provided in a simulated implementation as a software data structure. Also, the physical address space used to access memory 50 in the hardware apparatus 2 could be emulated as a simulated address space which is mapped on to the virtual address space used by the host operating system 510 by the simulator 505. In arrangements where one or more of the hardware elements referenced in the previously described examples are present on the host hardware (for example host processor 515), some simulated implementations may make use of the host hardware, where suitable.

The simulator program 505 may be stored on a computer readable storage medium (which may be a non-transitory medium), and provides a virtual hardware interface (instruction execution environment) to the target code 500 (which may include applications, operating systems and a hypervisor) which is the same as the hardware interface of the hardware architecture being modelled by the simulator program 505. Thus, the program instructions of the target code 500 may be executed from within the instruction execution environment using the simulator program 505, so that a host computer 515 which does not actually have the hardware features of the apparatus 2 discussed above can emulate those features. The simulator program may include processing program logic 520 to emulate the behaviour of the processing pipeline 4, 200, capability checking program logic 522 to emulate the behaviour of the capability checking circuitry 205, and capability generation program logic 525 to emulate behaviour of the capability generation circuitry 210 of the hardware apparatus of FIGS. 1 and 6. Hence, the techniques described herein for generating capabilities in response to capability generating instructions of the type discussed earlier can in the example of FIG. 13 be performed in software by the simulator program 505.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative example implementations of the invention have been described in detail herein with reference to the accompanying drawings, it is to be understood that the invention is not limited to those precise implementations, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
   processing circuitry configured to perform operations during which access requests to memory are generated, wherein the processing circuitry is configured to generate memory addresses for the access requests using capabilities that provide a pointer value and associated constraining information; and
   capability generation circuitry, responsive to the processing circuitry executing a capability generating instruction that identifies a location in a literal pool of the memory, to retrieve a literal value from the location in the literal pool, and to produce a generated capability in which the pointer value of the generated capability is determined from the literal value, and the constraining information of the generated capability is selected from a limited set of options in dependence on information specified by the capability generating instruction.

2. An apparatus as claimed in claim 1, wherein the capability generating instruction specifies an immediate value that is used by the capability generation circuitry, in combination with a current program counter value, to identify the location in the literal pool containing the literal value to be used to determine the pointer value of the generated capability.

3. An apparatus as claimed in claim 1, wherein the constraining information includes bounds information identifying a region of memory accessible using memory addresses derived from the pointer value of the generated capability, and the limited set of options comprises a limited set of allowable sizes of the region identified by the bounds information.

4. An apparatus as claimed in claim 3, wherein the capability generating instruction specifies a size indication value used by the capability generation circuitry to determine a size of the region from the limited set of allowable sizes.

5. An apparatus as claimed in claim 3, wherein the literal value includes a number of redundant bits that are not used to determine the pointer value, and the capability generation circuitry is configured to determine a size of the region from information provided within the redundant bits of the literal value.

6. An apparatus as claimed in claim 5, wherein the capability generation circuitry is configured to determine a boundary within the literal value between a first part specifying bits used to determine the pointer value and a second part containing the redundant bits, in dependence on an encoding scheme used to form the literal value.

7. An apparatus as claimed in claim 3, wherein the bounds information identifies a first bound determined from the pointer value, and a second bound determined from the first bound and a size of the region determined from the limited set of allowable sizes.

8. An apparatus as claimed in claim 1, wherein the constraining information comprises items of metadata, and the limited set of options comprises a limited set of possible values for the items of metadata.

9. An apparatus as claimed in claim 8, wherein the capability generating instruction specifies metadata information used by the capability generation circuitry to determine values for one or more of the items of metadata.

10. An apparatus as claimed in claim 9, wherein the determined values for the one or more of the items of metadata are dependent on a current operating mode of the processing circuitry.

11. An apparatus as claimed in claim 8, further comprising a control register referenced by the capability generation circuitry to determine values for one or more of the items of metadata.

12. An apparatus as claimed in claim 8, wherein the literal value includes a number of redundant bits that are not used to determine the pointer value, and the processing circuitry is configured to determine values for one or more of the items of metadata from information provided within the redundant bits of the literal value.

13. An apparatus as claimed in claim 8, wherein the items of metadata comprise a plurality of permission indications identifying allowable uses of the generated capability, and the limited set of options comprises a limited set of allowed combinations of permissions that may be indicated by the plurality of permission indications.

14. An apparatus as claimed in claim 13, wherein the capability generation circuitry is configured to determine the combination of permissions to indicate by the plurality of permission indications in dependence on a type of the generated capability.

15. An apparatus as claimed in claim 14, wherein the capability generating instruction specifies a destination capability storage element, and the capability generation circuitry is configured to infer the type of the generated capability from the specified destination capability storage element.

16. An apparatus as claimed in claim 1, wherein:
the capability generating instruction specifies a destination capability storage element; and
when the specified destination capability storage element is a program counter capability storage element used to store a program counter capability, the processing circuitry is configured, once the generated capability has been stored into the program counter capability storage element, to cause program execution to branch to a target instruction identified using the generated capability.

17. An apparatus as claimed in claim 1, wherein:
the capability generating instruction specifies a destination capability storage element; and
the capability generation circuitry is configured to trigger a fault if the specified destination capability storage element is a program counter capability storage element.

18. An apparatus as claimed in claim 1, wherein:
the capability generation circuitry is configured, in response to the processing circuitry executing the capability generating instruction, to produce the generated capability and one or more further generated capabilities, wherein for each further generated capability the capability generation circuitry is configured to determine the pointer value for that further generated capability from an associated literal value obtained from an associated location in the literal pool that is offset from the location identified by the capability generating instruction.

19. A method of constraining access to memory, comprising:
employing processing circuitry to perform operations during which access requests to memory are generated, wherein the processing circuitry generates memory addresses for the access requests using capabilities that provide a pointer value and associated constraining information; and
performing a capability generation operation in response to the processing circuitry executing a capability generating instruction that identifies a location in a literal pool of the memory, the capability generation operation comprising retrieving a literal value from the location in the literal pool, and producing a generated capability in which the pointer value of the generated capability is determined from the literal value, and the constraining information of the generated capability is selected from a limited set of options in dependence on information specified by the capability generating instruction.

20. A non-transitory computer-readable medium storing a computer program for controlling a host data processing apparatus to provide an instruction execution environment, comprising:
processing program logic to perform operations during which access requests to memory are generated, wherein the processing program logic is configured to generate memory addresses for the access requests using capabilities that provide a pointer value and associated constraining information; and
capability generation program logic, responsive to the processing program logic executing a capability generating instruction that identifies a location in a literal pool of the memory, to retrieve a literal value from the location in the literal pool, and to produce a generated capability in which the pointer value of the generated capability is determined from the literal value, and the constraining information of the generated capability is selected from a limited set of options in dependence on information specified by the capability generating instruction.

*    *    *    *    *